(12) United States Patent
Kudva et al.

(10) Patent No.: US 8,122,158 B1
(45) Date of Patent: Feb. 21, 2012

(54) METHOD FOR IMPROVING I/O PERFORMANCE OF HOST SYSTEMS BY APPLYING FUTURE TIME INTERVAL POLICIES WHEN USING EXTERNAL STORAGE SYSTEMS

(75) Inventors: Santhosh Venkatesh Kudva, Kamataka (IN); Ajith Balakrishnan, Kamataka (IN)

(73) Assignee: EMC Corporation, Hopkinton, MA (US)

( * ) Notice: Subject to any disclaimer, the term of this patent is extended or adjusted under 35 U.S.C. 154(b) by 181 days.

(21) Appl. No.: 12/566,846

(22) Filed: Sep. 25, 2009

(51) Int. Cl.
*G06F 13/00* (2006.01)
*G06F 3/00* (2006.01)

(52) U.S. Cl. ............. 710/7; 710/1; 710/2; 710/8; 710/9; 710/10; 345/474; 345/473; 726/18; 726/26

(58) Field of Classification Search .................. 710/1, 2, 710/7–10; 345/474, 473; 726/18, 2, 26
See application file for complete search history.

(56) References Cited

U.S. PATENT DOCUMENTS

| | | | |
|---|---|---|---|
| 7,171,687 B2 * | 1/2007 | Uemura | 726/18 |
| 7,236,176 B2 * | 6/2007 | Milinusic | 345/474 |
| 2002/0021665 A1 * | 2/2002 | Bhagavath et al. | 370/229 |

* cited by examiner

*Primary Examiner* — Tammara Peyton
(74) *Attorney, Agent, or Firm* — Krishnendu Gupta; Robert Kevin Perkins (57) ABSTRACT

A method, system, and a computer program product for improving IO (input/output) performance of host systems using external storage systems. An aspect of the present invention predicts policies to be applied in the host system based on historical information. Several characteristics of a set of IO requests sent by a host system are collected and analyzed to determine a usage/IO pattern. A suitable policy is then determined based on the pattern and applied on the host system when a similar pattern of IO requests is sought to be sent again, thereby improving the IO performance of the host system.

20 Claims, 8 Drawing Sheets

METHOD FOR IMPROVING I/O PERFORMANCE OF HOST SYSTEMS BY APPLYING FUTURE TIME INTERVAL POLICIES WHEN USING EXTERNAL STORAGE SYSTEMS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to data storage for users of computers, and more specifically to methods, systems, and a computer program product for improving IO (input/output) performance of host systems using external storage systems.

BACKGROUND

In many environments where host systems use external storage systems, there are multiple physical paths, or buses, to each storage system. One reason for having multiple paths is to provide redundancy in the case of a failed path. Host systems (using appropriate software) send IO (input/output) requests on the multiple physical paths based on specific policies, generally enforced by the software or the operating system in the host systems. Some of the policies may cause the IO requests to be sent on a combination of paths not conducive to optimal processing by the storage system, generally due to the IO request type, the storage system type or the bus type. As such, IO performance of the host system (as well as the storage system) may be reduced.

SUMMARY

An aspect of the present invention improves the IO performance of a host system by first determining the policies to be, applied in the host system at future time intervals, including a first policy to be applied at a first future time interval. The host system is then configured to apply the first policy during the first future time interval after the determination of the policies.

BRIEF DESCRIPTION OF DRAWINGS

The above and further advantages of the present invention may be better under stood by referring to the following description taken into conjunction with the accompanying drawings in which.

DETAILED DESCRIPTION

Current approaches to selecting policies enforced in host systems do not take into consideration the short term and long term behavioral trends of the IO requests sent by the host systems. The techniques described herein provide the ability to understand the IO request trends and to predict policies suitable for the trends, thereby improving the IO performance of the host systems and the external storage systems.

In an embodiment, IO requests sent from the host system to a storage system during past time intervals is monitored and characteristics of the host system when sending the IO requests is collected. A pattern of the IO requests is then identified based on analysis of the collected characteristics and a policy suitable for the identified pattern is predicted. The host system is then configured to apply the predicted policy during a future time interval (when a similar pattern of IO requests is sought to be sent again).

Thus, the historical information indicating the short/long term behavioral trend of the IO requests is captured and analyzed for predicting policies to be enforced in the host systems for future time intervals.

Several techniques of the present invention may be used for pre-emptive prediction of faults in the host systems and/or the external storage systems. The techniques may also be used for predicting a complete set of policies to be enforced in a data center (containing one or more host systems) at each of the future time intervals.

In a preferred embodiment, described below, a predictor tool containing a collector, an analyzer, a policy engine and an emitter is provided. The collector collects information related to the IO requests sent from a host system to a storage system during a past time interval. The analyzer analyzes the collected information and identifies a pattern of the IO requests. The policy engine predicts a policy for a future time interval based on the pattern identified for the past time interval. The emitter configures the host system to apply the policy during the future time interval when sending IO requests to the storage system.

Reference is now made in detail to exemplary embodiments of the invention, examples of which are illustrated in the accompanying Figures.

Figure 1:
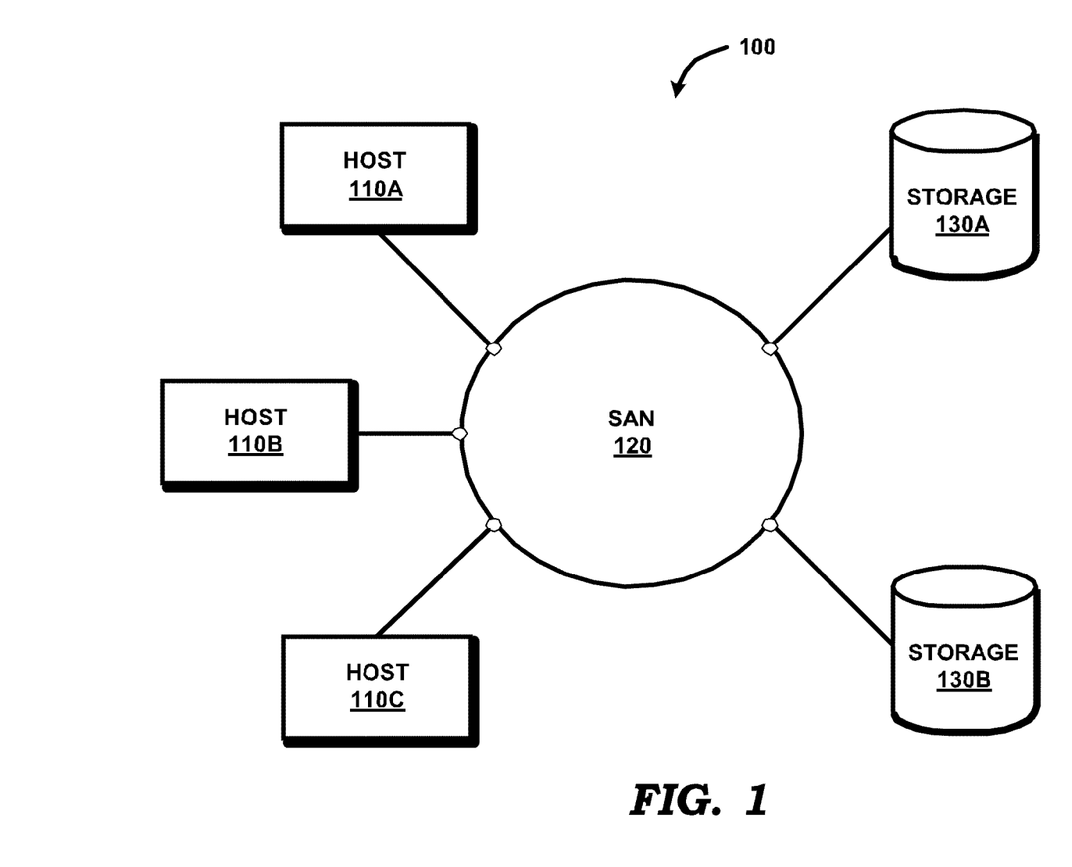
FIG. 1 shows a data storage environment in which several aspects of the present invention are implemented in one embodiment.

FIG. 1 shows a data storage environment 100 in which several aspects of the present invention are implemented in one embodiment. The data storage environment, for example, a data center, is shown containing hosts 110A-110C and storage systems 130A-130B connected by storage area network (SAN) 120. However, a data storage environment may contain more number/type of host systems and storage systems, depending on the purpose for which the environment is designed.

SAN 120 represents a high-speed special-purpose network that interconnects storage systems with host systems. SAN 120 facilitates storage systems to be viewed as storage that is locally attached to the host systems, instead of being represented as independent entities.

Each of storage systems 130A-130B represents an external non-volatile storage system facilitating storage and retrieval of a collection of data by host systems connected to SAN 120. Each of storage systems 130A-130B may be a single physical data storage device or a data storage system comprising multiple (an array of) physical data storage devices (and as such the storage system is also referred to as a storage array). Each of storage systems 130A-130B may be a SYMMETRIX data storage system or a CLARiiON data storage system available from EMC Corporation of Hopkinton, or other similar data storage systems.

Each of hosts 110A-110C represents a host system such as a server system, a personal computer, workstation, mobile station, etc. or any other system/device capable of initiating read and write requests to storage systems 130A-130B. Hosts 110A-110C send IO (input/output) requests for accessing desired data to the specific one (having the desired data) of the storage systems 130A-130B and receive the desired data as corresponding responses to the IO requests. The IO requests from a host system to a storage system (and the corresponding responses) may be sent on multiple physical paths/buses present in SAN 120.

Figure 2:
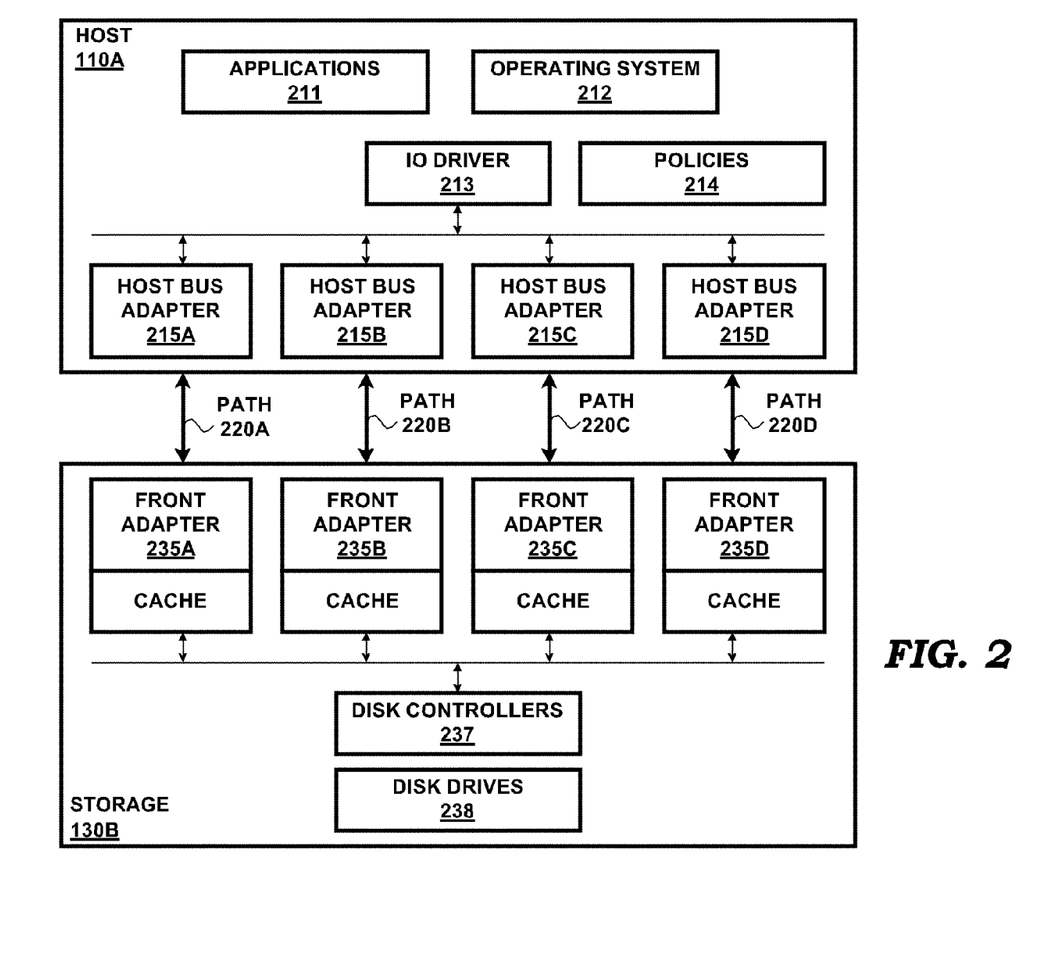
FIG. 2 shows multiple paths between an exemplary host system and an exemplary storage system of FIG. 1.

FIG. 2 shows multiple paths between an exemplary host system (110A) and an exemplary storage system (130B) in data storage environment 100 of FIG. 1. Host 110A is shown containing applications 211, operating system 212, IO driver 213, policies 214 and host bus adapters (HBA) 215A-215D, while storage system 130B is shown containing front adaptors (FA) 235A-235D having an associated cache, disk controllers 237 and disk drives 238.

Host 110A is also shown having multiple paths 220A-220D for sending IO requests to storage system 130B. Though only four paths are shown in FIG. 2 for illustration, in alternative embodiments any number of paths (typically between 2 and 32) may be present from a host system to an external storage system.

Each of paths 220A-220D may be any of a number of different types of communication links that allow data to be passed between storage system 130B and host 110A. Each of the host bus adapters 215A-215D as well as front adaptors 235A-235D is adapted to communicate using an appropriate protocol via the paths 220A-220D. For example, when path 220A is implemented as a Small Computer System Interface (SCSI) bus, each of host bus adapter 215A and front adaptor 235A is a SCSI driver designed to communicate using the SCSI protocol. Alternatively, the paths between host 110A and storage system 130B may be implemented using other storage bus standards such as eSATA, Fibre Channel, etc. or may include multiple communication path types.

In storage system 130B, disk drives 238 represent a non-volatile storage (in the form of a single physical disk or an array of physical disks) from which data is sought to be accessed using IO requests. Disk drives 238 enable data to be accessed in the form of data blocks, with each data block being the smallest unit of disk access and uniquely identified by a corresponding identifier. Each physical disk (or a portion thereof) may be exposed as corresponding physical (or logical) drives to the hosts systems.

Disk controllers 237 receives IO requests forwarded by front adaptors 235A-235D, and correspondingly access portions (data blocks) of disk drives 238 to read/write data as specified in the IO requests. Typically, each of disk controllers 237 is designed to access a corresponding one of the physical disks in disk drives 238.

Each of front adaptors 235A-235D receives IO requests on the corresponding paths 220A-220D and forwards the requests to disk controllers 237. On receiving data from disk controllers 237, each front adaptor maintains a temporary copy of the retrieved data (specified in the IO request) in the associated cache. The front adaptor then sends the retrieved data as (one or more) responses to the received IO request, typically on the same path on which the IO request was received.

Front adaptors 235A-235D may be designed to retrieve more data than requested by host 110A to facilitate efficient processing of subsequent IO requests. The additional data retrieved and stored in the associated caches may be based on the "locality of reference" principle which specifies that IO requests received in a short duration of time generally access the same or relatively close (in terms of spatial orientation or identifier values) data blocks. Thus, by retrieving the additional data into the cache, a front adaptor is enabled to process subsequent IO requests (and send corresponding responses) using the data in the cache, without accessing disk drives 238. Such an implementation is generally desirable as the IO performance of storage system 130B is improved.

In host 110A, applications 211 are executed in the context of operating system 212 of host 110A and may access data in storage system 130B via IO driver 213 and host bus adapters 215A-215D. IO driver 213 facilitates the sending of IO requests from applications 211 running on host 110A to storage system 130B on multiple paths. An exemplary host IO driver is the PowerPath tool, available from EMC Corporation of Hopkinton, Mass.

IO driver 213 typically maintains data indicating the logical unit number (LUN) associated with each of the physical/logical drives exposed by the different storage systems, and then determines the specific IO requests directed to storage system 130B based on the LUNs specified in the IO requests. IO driver 213 may queue the IO requests sought to be sent from host 110A to storage system 130B. In addition, IO driver 213 decides which IO requests to send, how many IO requests to send, and the speed at which to send IO requests. IO driver 213 may also keep a record of IO requests that are sent to storage system 130B until the IO requests are processed by storage system 130B (that is until corresponding responses are received).

IO driver 213 also selects the physical paths/buses on which IO requests are to be sent based on policies 214. Different policies enforced in host 110A may cause the same set of IO requests to be sent on different combinations of paths 220A-220D. A default policy may specify that IO requests are to be sent on any available one of paths 220A-220D, and accordingly a set of IO requests may be sent in the combination 220A, 220C, 220D, 220B, 220A, 220B, etc. The default policy may be system or user defined on inception of the host system into use in the data storage environment. The default policy may be viewed as the starting policy against which the IO performance of the host system is evaluated.

Some of the combinations of the paths may not be conducive to the optimal processing of IO requests by storage system 130B and accordingly may result in the reducing the IO performance of the host/storage systems. IO performance is typically measured in terms of the throughput (number of IO requests processed or the number of disk blocks retrieved per unit time) of the host/storage systems and the latency time (time taken to process each IO request). Higher values for the throughput and lower values for latency time indicate improved IO performance.

Thus, when a set of IO requests for a sequential set of data blocks in disk drives 238 is sought to be sent, sending a first IO request for a first data block on path 220A may cause the nearby (subsequent) data blocks to be retrieved into front adaptor 235A cache (due to the locality of reference principle noted above). Accordingly, sending a second IO request for the next data block on another path 220C (according to the default policy) may cause the next data block to be retrieved again (though the next data block is already available in front adaptor 235A cache), thereby reducing the IO performance (due to lower throughput and higher latency time) of the host/storage systems.

In some scenarios, a similar pattern of IO requests may be sent periodically from host 110A to storage system 130B. For example, a backup application executing in host 110A may be configured to perform a periodic backup of data stored in storage system 130B. The performance of the backup typically necessitates access of a sequential set of data blocks and accordingly, a similar pattern of IO requests may be sent at two different time intervals. At least for such scenarios, it may be desirable that policies suitable for the requests sent during the past time interval be applied in host 110A during the future time interval to improve the IO performance of the host system.

Figure 3:
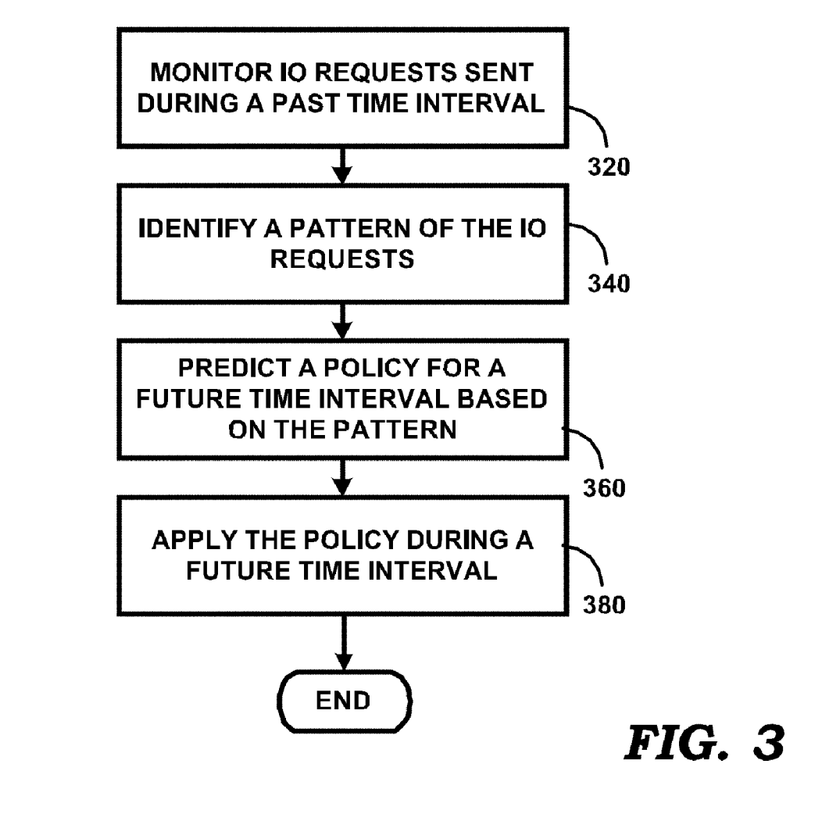
FIG. 3 shows an overview of an embodiment of prediction of policies for the host system of FIG. 2.

FIG. 3 shows an overview of an embodiment of prediction of policies (based on historical information) for host system 110A of FIG. 2. However, in alternative embodiments, some of the steps may be performed in a different sequence than that depicted below, as suited to the specific environment, as will be apparent to one skilled in the relevant arts.

In step 320, the IO requests sent (for example, from host 110A to storage system 130B) during a past time interval are monitored and several characteristics, such as the identifier of the disk block accessed, the completion time, the physical paths available, the processor load, and others at the time of sending of the IO requests is collected. The characteristics may be collected for all the IO requests sent by host 110A to storage system 130B.

Alternatively, characteristics may be collected for only a sample of IO requests sent during the past time interval. Sampling may be performed at a regular time interval (e.g., every 15 seconds), with the characteristics being collected only for the IO requests sent at the sampling time instances. Sampling techniques such as Monte Carlo methods may be well suited for sampling given that the IO requests arrive (at IO driver 213) randomly based on user load and activities.

In step 340, a pattern of the IO requests is identified by analysis of at least some of the collected characteristics. A pattern or trend may be determined as a function of one or more characteristics over a time period. For example, data blocks accessed in IO requests sent from a host system can provide trends on whether the host system experiences predominantly sequential or random IO. Thus, a set of IO requests may be identified as a sequential IO pattern (indicating that a sequence of disk blocks are accessed) when the identifiers of the disk blocks collected from the IO requests during monitoring are determined to be sequential within a tolerance.

More complex statistical analysis of the collected characteristics may be performed to identify the pattern of IO requests. In addition, techniques such as curve fitting, linear approximations, and control charts, well known in the relevant arts, may be used for identifying the pattern of IO requests. Approximations and tolerance may also be used in association with the above techniques.

In step 360, a policy for a future time interval is predicted based on the identified pattern. The prediction of the policy may be performed based on rules specified by a user. For example, a user may specify a rule indicating that Stream IO policy is to be used when the pattern of IO requests is identified as a sequential pattern. The Stream IO policy may specify that all the IO requests are to be sent only on one of the paths (for example, 220A).

In one embodiment, IO driver 213 supports a pre-defined set of policies (each of which sends a pre-determined number of IO requests in a corresponding combination) including a Stream IO policy (sends the IO requests on a single path), a RoundRobin policy (sends the IO requests distributed over the paths in a circular order), etc. Accordingly, prediction of the policy for the future time interval may entail selection of a suitable one of the pre-defined set of policies.

In step 380, the host system is configured to apply/enforce the predicted policy during a future time interval (when a similar pattern of IO requests are sought to be sent from host 110A to storage system 130B). A policy is typically enforced in a host system by configuring hardware/software parameters of the host system. The configuration of the parameters may be performed by issuing appropriate commands to IO driver 213, issuing appropriate host operating system commands, editing configuration files, and using system tools available on the host system.

For the above example, the Stream IO policy (sends all IO requests on a single path) determined based on the sequential pattern of the IO requests in the past time interval is enforced in host 110A during a future time interval. Accordingly, a first IO request and a second IO request in the sequential pattern of IO requests are sent on the same physical path 220A, thereby enabling the second IO request to be processed using the data stored in the cache (of front adaptor 235A) during the processing of the first IO request. Additional overhead of retrieving data from disk drives 238 is avoided, thereby improving the IO performance (due to higher throughput and lower latency time) of the host and storage systems.

Preferably, all the policies to be applied in a host system during multiple future time intervals are first determined in step 360, before configuration of the host system in step 380 is performed. The configuration step may be performed at (or just before) each future time interval.

Figure 4:
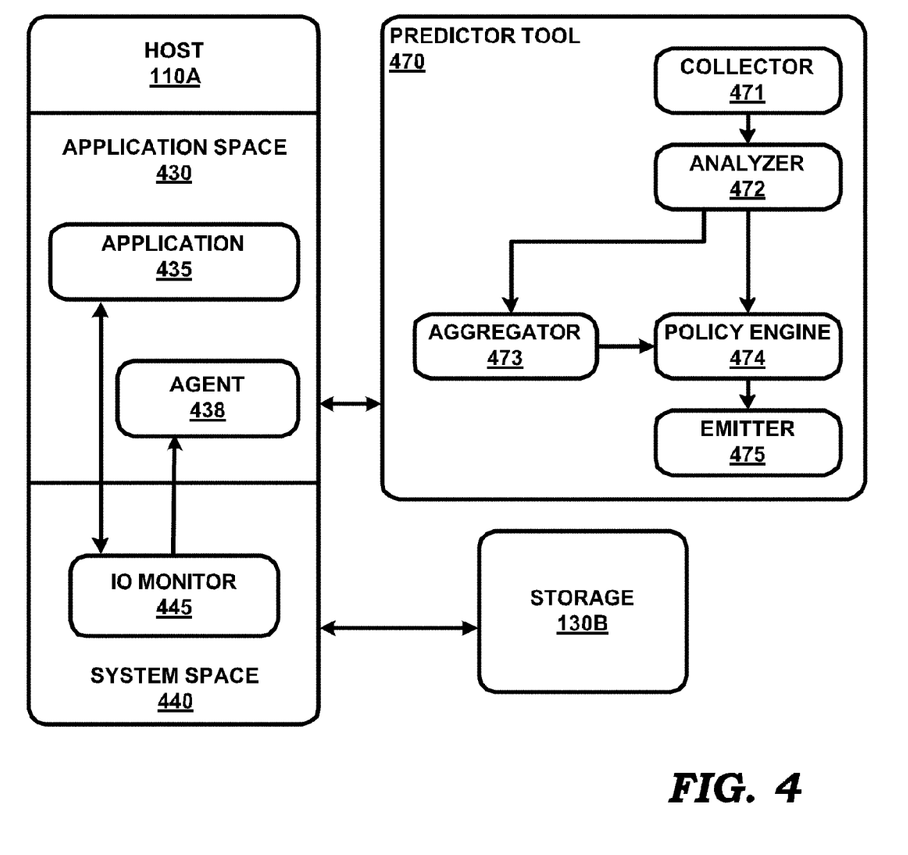
FIG. 4 shows components of a predictor tool predicting policies for the host system of FIG. 2.

FIG. 4 shows components of an example implementation (predictor tool 470) for predicting policies for host system 110A of FIG. 2. Though only a single host system (host 110A) is shown as sending collected information to predictor tool 470, other host systems (such as host 110B-110C) may be similarly configured to collect and send information on IO requests to predictor tool 470.

Host 110A is shown containing application space 430 and system space 440, each of which may be an electronic memory, such as random access memory (RAM) or portions thereof. Application 435 shown executing in application space 430 sends IO requests directed to storage system 130B. IO monitor 445 shown executing in system space 440 monitors the IO requests directed to storage system 130B, collects information related to various characteristics of host 110A and the IO requests and forwards the collected information to agent 438 shown executing in application space 430. IO monitor 445 may be implemented as part of IO driver 213 as described below with respect to FIG. 6.

Table 1 shows a list of characteristics that may be collected by IO monitor 445 in one embodiment. In Table 1, the "Characteristic" column specifies the details of the collected characteristic, the "Scope" column indicates the systems for which the characteristic is collected and the "Why" column indicates the reason (such as for IO Pattern determination, Performance, Fault detection, etc.) for collecting the characteristic.

TABLE 1

Collected Characteristics

| Characteristic | Scope | Why |
| --- | --- | --- |
| Thread ID | Host | IO patterns/Performance |
| IO Size (number of bytes) | Host | IO patterns/Performance |
| Disk Block number | Host | IO patterns/Performance |
| Target information in the form (HBA ID, target FA ID, LUN) where LUN identifies the physical/logical drive | Host | IO patterns/Performance |
| Total number of IOs completed | Host | IO patterns/Performance |
| Total number of IOs dispatched | All (per array, per HBA, per FA, per host, etc.) | IO patterns/Performance |
| IO completion time | All | IO patterns/Performance |
| Amount of memory consumed in the sampling interval | Host | Co-relation with IO statistics as in how much memory used for IO |
| Path transitions dead <--> alive | All | Fault detection |
| NDU (non disruptive upgrade) occurrences | Per Array | Fault detection |
| Count of pending IOs every second | All | IO patterns/Performance |
| IO errors | All | Fault detection |
| Processor load during the sample time interval | Host | Environmental Info |
| Number of online processors | Host | Environmental Info |
| Amount of physical memory | Host | Environmental Info |
| Swap consumption | Host | Environmental Info |
| Type of IO bufs (reads vs. writes vs. IOCTLs) | All | IO patterns/Performance |
| Size of the target LUN | Host, per array | Environmental Info |
| Number of running processes | Host | Environmental Info |
| Number of users online | Host | Environmental Info |
| Number of HBAs on the system | Host | Environmental Info |
| Current IO driver policy | Host | IO patterns/Performance |
| Priority | Host | IO patterns/Performance |
| Throttling | Host | IO patterns/Performance |
| Number of Device Opens | All | IO patterns/Performance |
| IO retries done | All | Fault detection |
| Number of Test paths executed | All | Fault detection/Performance |

Agent 438 executing in application space 430 receives the collected characteristics from IO monitor 445 and forwards the received information to predictor tool 470. The specific characteristics to be collected in host 110A may be pre-configured or may be received from predictor tool 470.

Agent 438 also receives from predictor tool 470, the policies to be applied in future time intervals and then configures host 110A to enforce the received policies during the corresponding time intervals. It may be appreciated that execution of agent 438 in application space 430 (instead of system space 440) facilitates monitoring and collecting of information on IO requests to be performed without reducing the IO performance of the host system.

Referring again to FIG. 4, Predictor tool 470 predicts and enforces policies according to several aspects of the present invention. Predictor tool 470 is shown containing collector 471, analyzer 472, aggregator 473, policy engine 474 and emitter 475.

Collector 471 collects information from multiple hosts (such as 110A-110C) using corresponding agents (such as agent 438) executing in the hosts. Collector 471 may receive a pre-defined set of characteristics or may send request for collection of desired characteristics to the agents. Collector 471 may store the collected information in a non-volatile storage.

Analyzer 472 analyzes the collected information (currently received by collector 471 and/or previously stored in the non-volatile storage) and identifies the patterns (behavioral trends) of the IO requests sent from a host system to a storage system.

Analyzer 472, to facilitate analysis, may first determine a set of computed characteristics based on the collected characteristics. Alternatively, the computed characteristics may be determined by agent 438 in host 110A and then sent to collector 471. Table 2 shows a list of characteristics that may be computed by analyzer 472 in one embodiment. In Table 2, the "Characteristic" column specifies the details of the computed characteristic and the "How" column indicates the manner of computation of the corresponding characteristic (based on some of the collected characteristics).

TABLE 2

Computed Characteristics

| Characteristic | How |
| --- | --- |
| Number of LUNs serviced | Based on the individual LUNs specified in the target information for multiple IO requests |
| Number of Arrays serviced | Based on determining the individual storage systems/arrays specified in the target information (using the LUN) for multiple IO requests |
| IOs on a Per LUN basis | Computed from the target information for multiple IO requests |
| IOs on a per array basis | Computed from the target information for multiple IO requests |
| Average IO completion time | Based on IO completion time for multiple IO requests |
| Average completion time per array | Based on IO completion time and the target information (to determine the specific array/storage system) for multiple IO requests |
| Average completion time per target LUN | Based on IO completion time and the target information (indicating LUNs) for multiple IO requests |
| IOs per HBA | Same as IOs on a Per LUN basis, the target information indicating the HBA and also the "Number of HBAs on the system" |
| IOs per Target Port (FA) | Same as IOs on a Per LUN basis, the target information indicating the Target Port (FA) |
| Thread IDs for that session | Based on Thread ID to determine whether the IOs are single threaded or multi-threaded |

Analyzer 472 may then analyze the collected computer characteristics to identify a pattern/trend of the IO requests. Table 3 shows a list of track numbers (accessed in storage system 130B) collected from a host system when sending IO requests to two different storage systems. The track numbers may be determined based on the disk block identifiers specified in the IO requests and the geometry of disk drives 238 of storage system 130B available in host 110A.

TABLE 3

Track Number Samples

| Time | Sample 1 | Sample 2 |
| --- | --- | --- |
| 1 | 2 | 48 |
| 2 | 2 | 11 |
| 3 | 3 | 21 |
| 4 | 4 | 23 |
| 5 | 6 | 6 |
| 6 | 5 | 25 |
| 7 | 7 | 9 |
| 8 | 8 | 28 |
| 9 | 9 | 9 |
| 10 | 8 | 8 |
| 11 | 12 | 12 |

TABLE 3-continued

Track Number Samples

| Time | Sample 1 | Sample 2 |
|------|----------|----------|
| 12 | 14 | 34 |
| 13 | 14 | 72 |
| 14 | 15 | 61 |
| 15 | 16 | 62 |
| 16 | 17 | 63 |
| 17 | 18 | 64 |
| 18 | 8 | 8 |
| 19 | 19 | 19 |
| 20 | 7 | 7 |
| 21 | 8 | 6 |
| 22 | 20 | 20 |
| 23 | 21 | 21 |
| 24 | 22 | 111 |
| 25 | 25 | 28 |
| 26 | 26 | 29 |
| 27 | 27 | 0 |
| 28 | 28 | 1 |
| 29 | 29 | 2 |
| 30 | 30 | 27 |
| 31 | 31 | 28 |
| 32 | 31 | 29 |
| 33 | 32 | 112 |
| 34 | 32 | 113 |
| 35 | 32 | 114 |
| 36 | 33 | 115 |
| 37 | 34 | 4 |
| 38 | 35 | 11 |
| 39 | 36 | 12 |
| 40 | 38 | 14 |
| 41 | 41 | 15 |
| 42 | 42 | 16 |
| 43 | 39 | 58 |
| 44 | 43 | 59 |
| 45 | 44 | 0 |
| 46 | 46 | 58 |
| 47 | 46 | 59 |
| 48 | 48 | 60 |
| 49 | 51 | 61 |
| 50 | 51 | 3 |
| 51 | 52 | 4 |
| 52 | 53 | 5 |
| 53 | 55 | 38 |
| 54 | 56 | 38 |
| 55 | 55 | 7 |
| 56 | 56 | 8 |
| 57 | 57 | 41 |
| 58 | 58 | 42 |
| 59 | 59 | 10 |
| 60 | 60 | 31 |

Figure 5A:
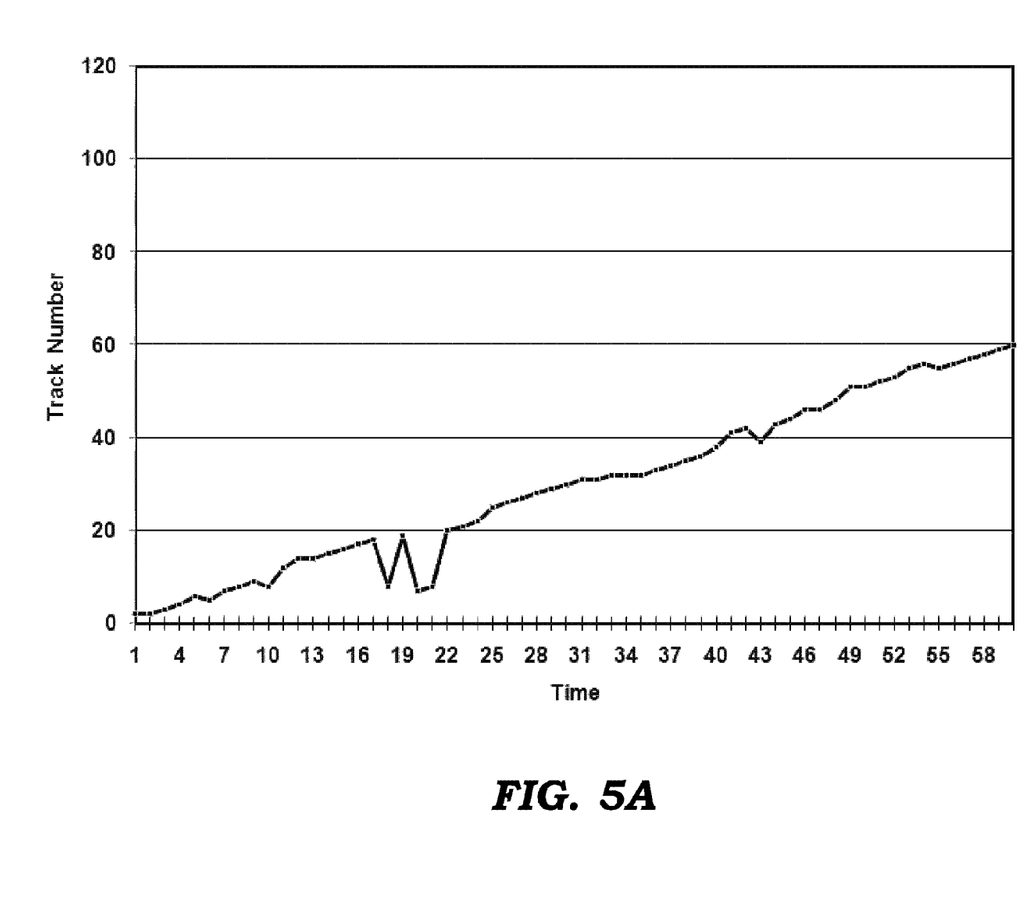
FIGS. 5A and 5B shows, in a graphical manner, an example characteristic collected for IO requests sent by the host system of FIG. 2.
Figure 5B:
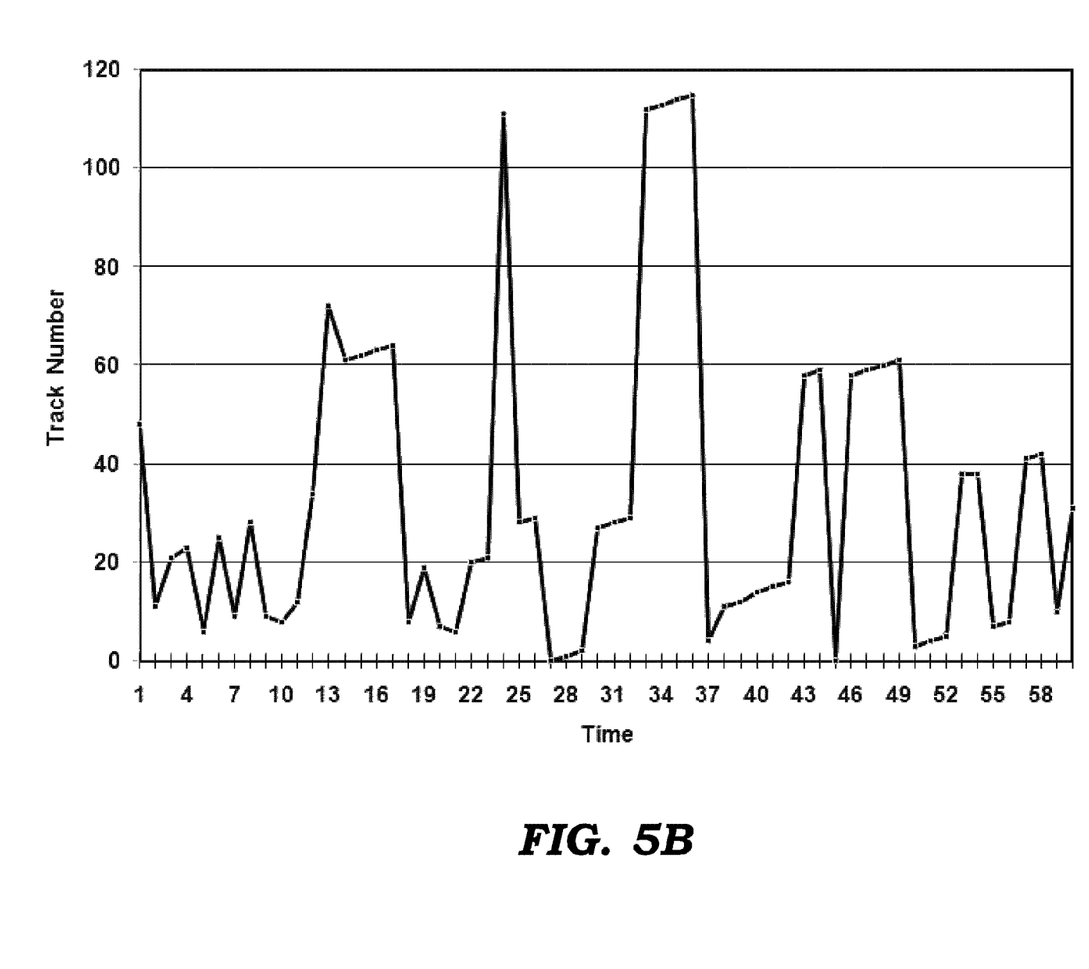

In Table 3, column "Time" indicates the time at which IO requests were sent, column "Sample 1" specifies the track numbers for IO requests to a first storage system (such as storage system 130B), while the column "Sample 2" specifies the track numbers for the IO requests to a second storage system. The track numbers specified in columns "Sample 1" and "Sample 2" is shown in the form of graphs respectively in FIG. 5A and FIG. 5B against time values in column "Time". The graph of FIG. 5A is approximately a linear graph indicating a sequential pattern of IO requests (as the data block identifiers keeps increasing linearly with time), while the graph of FIG. 5B is a non-linear graph not following a specific trend, thereby indicating a random pattern of IO requests.

Still referring to FIG. 4 and as noted above, analyzer 472 may determine the pattern of the IO requests based on statistical analysis of the track numbers (or the data block identifiers). For example, a sequential pattern may be identified if the disk blocks are accessed (based on the track numbers) in a sequential manner or at least in an increasing order of magnitude for 75% (or majority) of the IO requests in the time interval (being monitored). Alternatively, the sequential pattern may be identified if the set of blocks accessed by 75% (a majority) of the IO requests fall within the same track of disk drives 238.

Aggregator 473 analyzes the patterns determined by analyzer 472 to identify larger patterns over larger time intervals. For example, aggregator 473 may combine and analyze the patterns observed during two different time intervals t1 and t2 to determine a larger pattern for the combined time intervals of t1+t2. The larger time interval facilitates the policy predicted for the larger pattern to be enforced for a longer duration, thereby reducing frequent switching of policies in the host system. Furthermore, the longer duration may be required for providing time for the switching of different policies.

Aggregator 473 may analyze the aggregate of the IO patterns identified for different host systems to determine the behavioral trend of the whole data storage environment. The aggregate information may be used for predicting policies for individual host systems, such that policy selection can benefit from the information derived out of other hosts. This aggregate information may also be used to learn about faults that have been detected on host systems and provide probabilities of such failures for other host systems.

Policy engine 474 predicts the policies to be used for future time intervals based on the patterns/trends identified by analyzer 472 and/or aggregator 473. In one embodiment, policy engine 474 determines the policies based on user specified rules. Examples of policy prediction rules specified by a user are shown below:

IF (Read IO requests are sequential for a particular LUN) THEN set remote host policy to "Stream IO" for that LUN;

IF (IO completion time on particular path is larger than expected) THEN set the state of that path to "StandBy";

where LUN (logical unit number) is a unique identifier assigned by IO driver 213 for each storage system in the data storage environment, IO completion time is defined as the time taken from sending the IO request from host 110A to deeming the IO request as successfully completed (for example, on receiving the response to the request) and setting the state of a path to "StandBy" causes the path to be not considered (or considered as a last alternative) for sending subsequent IO requests.

Emitter 475 configures parameters of the host systems to apply predicted policies during future time intervals. Table 4 shows a list of parameters that may be configured to enforce policies in one embodiment. In Table 4, the "Parameter" column specifies the details of the parameter, the "For" column indicates what the parameter is used for and the "Values" column indicates the different values to which the parameter can be set and the corresponding effect on the selection of paths in IO driver 213.

TABLE 4

Parameters Used for Enforcing Policies

| Parameter | For | Values |
|-----------|-----|--------|
| Path Selection Policy (for each LUN) | Influencing the path selection for a pre-determined number of IO requests. Different policies pick paths in different combinations. | StreamIO - send the IO requests on a single path<br>RoundRobin - send the IO request distributed over the paths in a circular order<br>LeastIO - send each IO request on the path having the least pending IO requests<br>LeastBlock - send each IO request on the path having the least number of data block accesses |

TABLE 4-continued

Parameters Used for Enforcing Policies

| Parameter | For | Values |
|---|---|---|
| Path State (for each path, each LUN) | Specifies the state of each of the multiple paths. Ensures that slow paths are not selected by the path selection algorithm. | Standby - Don't send IO requests to this path unless no alternative is available Active - send IO requests on this path |
| Device Priority (for each LUN) | Ensure that some devices get more priority to dispatch IO than other contending devices | Number between 1 (lowest priority) and 10 (highest priority) |
| Memory Scanner Frequency | Asking the host to free unused memory more frequently so that the memory can be reused for subsequent IOs | Time interval in minutes and seconds (e.g., 30 minutes, 60 minutes) |
| Retry Timer/Interval | Specifying the time period after which a failed IO request is to be retried | Time interval in seconds |
| Retry Count | Specifying the number of times a failed IO request is to be retried | Number between 0 (no retries) and 100 (a special value may indicate infinite retries till the IO request is processed) |

In Table 4, the parameter "Path Selection Policy" is used to specify a suitable one of a pre-defined set of policies supported by IO driver 213. The parameters retry timer and count are used for improving the speed at which IOs are retried in case of failures. Long duration between retries may increase the IO completion time by increasing the time taken by IO driver 213 to take remedial action, and thereby reduce the IO performance of the host system.

In one embodiment, emitter 475 receives the policies to be applied from policy engine 474 and stores the predicted policies in a non-volatile storage. Emitter 475, at (or just before) the future time interval, retrieves the corresponding policy and then configures the host system to apply/enforce the policy when sending IO requests during the future time interval. Alternatively, emitter 475 may send the predicted policy to agents (such as agent 438) executing on the host systems, with the agents then configuring the host systems to apply the policies during the future time intervals.

Predictor tool 470 may keep track of the faults that occurred in the different host systems and storage systems in the data storage environment of FIG. 1, and also the specific IO patterns/trends present in the data storage environment before the occurrence of the faults. Accordingly, on identifying the same pattern/trend of IO requests being sent by host 110A, predictor tool 470 may send a notification to an administrator of host 110A (or to host 110A itself) of a potential chance of occurrence of a fault. The notification may indicate the severity of the fault, the location (host/storage) of the fault, recovery actions that may be performed (based on prior user inputs), etc.

Predictor tool 470, in particular, policy engine 474 may also predict faults based on user specified rules. Example rules used for predicting faults is shown below:

IF (number of failures for a path is high during a time interval) THEN either disable the path or set the path to "StandBy";

IF (a kind of error or set of errors is followed by the failure of a Service Processor on the storage system) THEN send notification for the potential failure possibility to the user.

In one embodiment, predictor tool 470 also monitors and collects characteristics of the IO requests during time intervals when policies predicted by predictor tool 470 are enforced in the host systems. The collected information is analyzed to determine whether the IO requests sent during the future time interval is similar (within an acceptable degree of tolerance) to or follows the pattern anticipated by the analysis performed for a past time interval. If the future pattern/trend contradicts the anticipated pattern, the future pattern may be aggregated with the anticipated pattern to identify a newer pattern and thereby predict a new policy.

Figure 6:
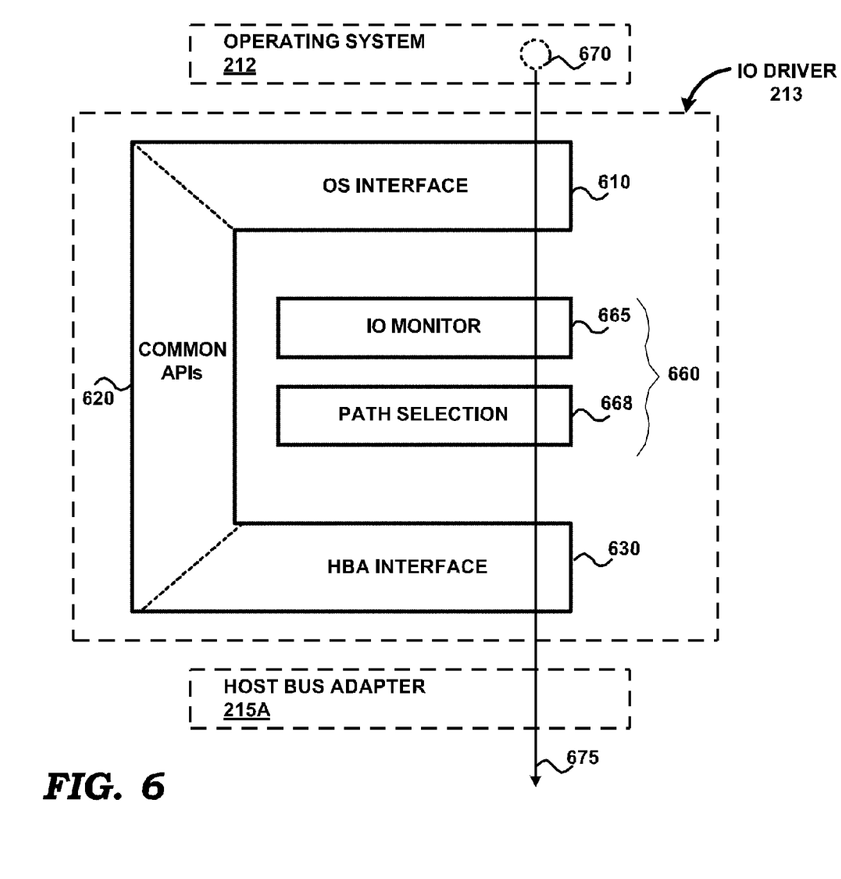
FIG. 6 shows collection of characteristics of IO requests sent by the host system of FIGS. 2.

FIG. 6 shows an example implementation (in IO driver 213) of collection of characteristics of IO requests sent by host system 110A of FIG. 2. In this implementation, it is assumed that IO driver 213 is based on PowerPath tool, noted above.

Although IO driver 213 only interacts with an operating system 212, IO driver 213 can conceptually be considered to be placed between operating system 212 and at least one host bus adapter 215A. IO driver 213 may be conceptually visualized as having the form of a "C" clamp with a top horizontal arm 610, a bottom horizontal arm 630, and a vertical connector 620 between the arms. Top horizontal arm 610 may be an interface to any operating system (OS) such as LINUX, Sun's SOLARIS, IBM's AIX, HP's HPUX, and Microsoft's WINDOWS NT. Bottom horizontal arm 630 includes platform-dependent code comprising an interface to relevant host bus adapters 215A-215D. Only host bus adapter 215A is shown for exemplary purposes: Vertical connector 620 comprises a series of common Application Programming Interfaces (APIs).

An advantage of the C clamp is that extensions can be written in a platform-independent manner because the arms 610, 630 translate all of the platform-dependent communications into more generic communications. An extension stack 660 containing a number of extensions is shown enveloped between arms 610 and 630. Path selection extension 668 determines the specific paths to be used for sending IO requests to storage system 130B according to policies 214. IO driver 213 communicates with the appropriate host bus adapters 215A-215D depending on which path is selected.

IO requests, such as IO request 670, are passed from the operating system 212 to the IO driver through the OS interface 610. IO request 670 enters into the middle of the "c-clamp" to IO monitor extension 665. IO monitor extension 665 (performing the role of IO monitor 445) intercepts IO request 660 before path selection extension 668 and collects the characteristics of IO request 660 and host 110A. IO monitor extension 665 then sends the collected information to agent 438.

The collection of the information related to IO request 670 may be performed by interfacing with the operating system data structures maintained for the IO requests. For example for Linux systems, the "buf" data structure maintained for each IO request may be inspected to determine the data block number/address (the identifier of the data block in the storage system), the number of bytes to transfer, the name of the storage system to which the IO request is being dispatched (as given by the operating system for the target LUN), etc.

After collecting the necessary information, IO monitor extension 665 forwards IO request 670 to the other extensions in extension stack 660. IO request 670 after progressing/processing by the other extensions in extension stack 660, finally exits out of the "c-clamp" structure to its destination storage system.

In one embodiment, users of data storage system of FIG. 1 are allowed to confirm, override or extend the policies predicted by predictor tool 470. The predictor tool is also designed to take the user inputs into consideration when predicting future policies. For example, if a predicted policy proves counter-productive (that is reduces IO performance of the host system), a user may make corrections to the values of the host parameters to rectify the issue. For minor corrections, predictor tool 470 may maintain and use the corrected set of values for the host parameters when the same policy is sought to be enforced again in any one of the host systems. For major corrections, predictor tool 470 may ignore the predicted policy and instead identify patterns for larger time intervals.

Users may also provide reinforcement to predictor tool 470 when the behavior of the IO requests is similar to the anticipated trend and the predicted policy improves the IO performance of the host and storage systems. Predictor tool 470 may take into account the reinforcement provide for different policies when predicting the policy to be used for a specific pattern.

Users may also use "tagging" to indicate that the pattern of IO requests sent is very peculiar or endemic to the time interval and the host system and accordingly, the pattern should not be take into account for other host systems. For example, a user may tag a period (for example, Saturday 9AM-10AM) during which maintenance of a storage system is regularly performed. Predictor tool 470 may keep track of the IO requests and failures occurring during the first occurrence of the period, and associate the tracked IO requests and failures with the tag. When the same sequence of IO requests and failures is repeated during the next occurrence of the period, predictor tool 470 may determine and enforce appropriate policies for the host systems to avoid IO requests from being sent to the storage system under maintenance.

Tagging may also be used by users to include/exclude IO requests used in identification of individual patterns and/or patterns used in aggregation. For example, if a set of IO requests or trends are outliers (distant/different from other data) and do not denote normal operation, a user may tag these requests/trends to exclude them from being used for policy prediction.

Figure 7:
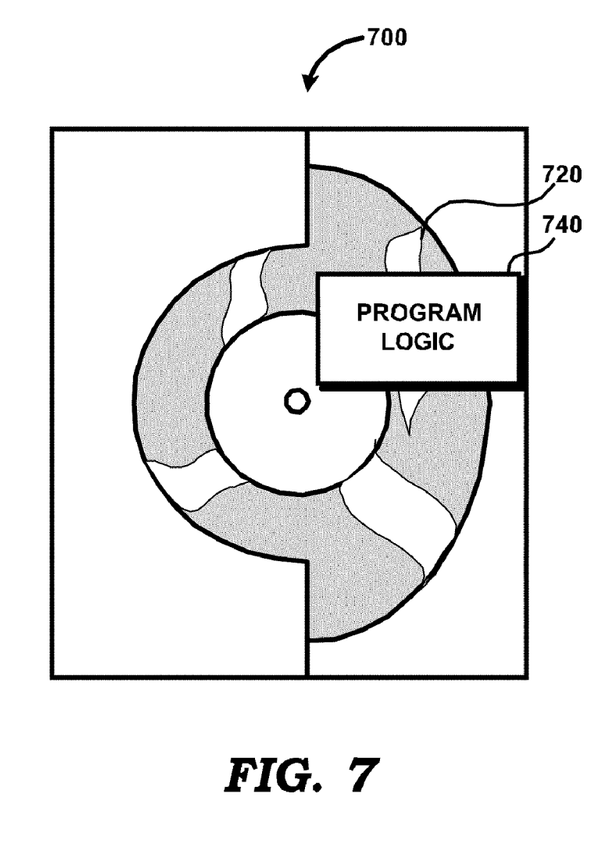
FIG. 7 shows a computer-readable medium encoded for computer-execution of prediction of policies embodiment of FIG. 3.

FIG. 7 shows a computer-readable medium 720 encoded for computer-execution of prediction of policies embodiment of FIG. 3. Program logic 740 embodied on computer-readable medium 720 is encoded in computer-executable code configured for carrying out the prediction of the policies and other aspects of the present invention described herein and thereby forms a computer program product 700.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of a program code, which when received and loaded into and executed by a machine, such as a computer, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine.

For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A method of improving IO performance of a host system, the method comprising:
 determining, before a time instance, a plurality of polices to be applied in the host system at a corresponding ones of a plurality of future time intervals when sending IO requests to a storage system, wherein each of the plurality of future time intervals is after the time instance and wherein at least two policies to be applied at different future time intervals are not identical; and
 configuring the host system to apply each of the plurality of policies for the corresponding one of the plurality of future time intervals,
 wherein the determining determines the plurality of policies prior to the configuring of the host system.

2. The method of claim 1, wherein the determining further comprises:
 monitoring a plurality of IO requests sent from the host system to the storage system during a plurality of past time intervals including a first past time interval, wherein each of the plurality of past time intervals is before the time instance;
 identifying a pattern of a first set of IO requests sent during the first past time interval, the first set of IO requests being contained in the plurality of IO requests;
 predicting a first policy for a first future time interval based on the pattern identified during the first past time interval.

3. The method of claim 1, wherein the monitoring further comprises:
 collecting a plurality of characteristics of the host system during the first past time interval; and
 analyzing at least one of the plurality of characteristics to identify the pattern of the first set of IO requests.

4. The method of claim 3, wherein the analyzing further determines a future occurrence of a fault in the host system based on the values collected for some of the plurality of characteristics during the first past time interval.

5. The method of claim 2, wherein the plurality of IO requests are sent from the host system to the storage system on a plurality of paths, wherein each of the plurality of policies specifies a corresponding one of a plurality of combinations of the plurality of paths to be used for sending the plurality of IO requests,
 wherein sending IO requests according to a first combination reduces the performance of the storage system and according to a second combination improves the performance of the storage system, the first combination and the second combination being contained in the plurality of combinations,
 wherein the host system is configured to use a default policy which causes the first set of IO requests to be sent using the first combination during the first future time interval,
 wherein the host system after being configured to use the first policy sends the first set of IO requests on the second combination of the plurality of paths during the first future time interval thereby improving the IO performance of the host system.

6. The method of claim 5, wherein the first set of IO requests are for a sequential set of data blocks stored in the storage system, wherein the identifying identifies that the pattern is a sequential pattern,
   wherein the default policy specifies that the first set of IO requests are to be sent on any available ones of the plurality of paths,
   wherein the first policy specifies that the first set of IO requests are to be sent only on one of the plurality of paths.

7. The method of claim 6, wherein the storage system contains a plurality of caches, each of plurality of caches being associated with a corresponding one of the plurality of paths, wherein a first cache contained in the plurality of caches is associated with a first path contained in the plurality of paths,
   wherein the storage system on receiving an IO request for a first data block on the first path is designed to retrieve a subset of the sequential set of data blocks into the first cache, wherein the first data block is contained in the sequential set of data blocks,
   wherein using the default policy in the host system causes another IO request for a second data block contained in the subset of the sequential set of data blocks to be sent on a second path contained in the plurality of paths,
   wherein using the first policy in the host system causes the another IO request for the second data block to be sent on the first path,
   wherein the storage system is enabled to process the another IO request for the second data block using the first cache, thereby improving the IO performance of the host system.

8. The method of claim 7, wherein the host system is designed to apply a pre-determined set of policies including a Stream IO policy and a RoundRobin policy,
   wherein each of the plurality of policies is one of the pre-determined set of policies,
   wherein the default policy is the RoundRobin policy and the first policy to be applied during the first future time interval is the Stream IO policy.

9. A computing system comprising:
   a storage system to store a plurality of data blocks;
   a host system to send IO requests to the storage system for accessing the plurality of data blocks;
   a predictor tool operable to:
      monitor a plurality of IO requests sent from the host system to the storage system during a plurality of past time intervals, said plurality of IO requests including a first set of IO requests sent during a first past time interval contained in said plurality of past time intervals;
      predict a plurality of policies to be applied in the host system at a corresponding ones of a plurality of future time intervals, wherein the plurality of policies includes a first policy to be applied at a first future time interval contained in the plurality of future time intervals, the first policy being determined based on the monitor of the first set of IO requests sent during the first past time interval;
      configure the host system to apply the first policy during the first future time interval,
      wherein the predictor tool predicts the plurality of polices prior to configuring the host system.

10. The computing system of claim 9, wherein the predictor tool is further operable to:
   collect a plurality of characteristics of the host system during the first past time interval;
   analyze at least one of the plurality of characteristics to identify a pattern of the some of the plurality of IO requests sent during the first past time interval,
   wherein the predictor tool predicts the first policy for the first future time interval based on the pattern identified during the first past time interval.

11. The computing system of claim 10, wherein the plurality of IO requests are sent from the host system to the storage system on a plurality of paths, wherein each of the plurality of policies specifies a corresponding one of a plurality of combinations of the plurality of paths to be used for sending the plurality of IO requests,
   wherein sending IO requests according to a first combination reduces the performance of the storage system and according to a second combination improves the performance of the storage system, the first combination and the second combination being contained in the plurality of combinations,
   wherein the host system is configured to use a default policy which causes the first set of IO requests to be sent using the first combination during the first future time interval,
   wherein the host system after configured to use the first policy sends the first set of IO requests on the second combination of the plurality of paths during the first future time interval thereby improving the IO performance of the host system.

12. The computing system of claim 10, further comprising:
   a second host system to send IO requests to the storage system for accessing the plurality of data blocks,
   wherein the predictor tool monitors a second plurality of IO requests sent from the second host system to the storage system, predicts a second policy to be applied in the host system at a second future time interval based on the monitor of some of the second plurality of IO requests sent during the first past time interval, and configures the host system to apply the second policy during the second future time interval,
   wherein the second policy is contained in the plurality of policies and the second future time interval is contained in the plurality of future time intervals.

13. The computing system of claim 12, wherein the predictor tool associates a fault in the second host system to the values collected for some of the plurality of characteristics during the first past time interval,
   wherein the predictor tool further determines a future occurrence of the same fault in the host system during the second future time interval based on the association.

14. A predictor tool to control performance of a host system designed to access data in a storage system, the predictor tool comprising:
   a collector to collect information related to a set of IO requests sent from the host system to storage system during a plurality of past time intervals;
   an analyzer to analyze the collected information and identify a pattern of the set of IO requests;
   a policy engine to predict a plurality of policies for corresponding ones of a plurality of future time intervals based on the pattern identified for the plurality of past time intervals; and
   an emitter to configure the host system to apply each of the plurality of policies during the corresponding ones of the plurality of future time intervals when sending IO requests to the storage system.

15. The predictor tool of claim 14, wherein the collector collects a plurality of characteristics of the host system during the past time interval,     wherein the analyzer analyzes at least one of the plurality of characteristics to identify the pattern of the set of IO requests.

16. The predictor tool of claim 15, wherein characteristics are collected and forwarded by an agent executing in the host system,     wherein the collector sends data indicating the plurality of characteristics to be collected to the agent.

17. The predictor tool of claim 16, wherein the analyzer further computes a second plurality of characteristics based on some of the plurality of characteristics collected from the host system,     wherein the analyzer also analyzes some of the second plurality of characteristics in identifying the pattern of the set of IO requests.

18. The predictor tool of claim 15, wherein the analyzer further determines a future occurrence of a fault in the host system based on the values collected for some of the plurality of characteristics during the past time interval.

19. The predictor tool of claim 18, wherein the policy engine predicts policies and the analyzer determines faults based on a set of rules specified by a user.

20. The predictor tool of claim 14, wherein the emitter sends a set of commands to the host system to configure the host system to apply the policy during the future time interval.

* * * * *